United States Patent [19]
Saito

[11] Patent Number: 5,852,957
[45] Date of Patent: Dec. 29, 1998

[54] SEPARATE PLATE FOR A CONTROL VALVE USED IN AN AUTOMATIC TRANSMISSION AND METHOD FOR FABRICATING SAME

[75] Inventor: Hiroshi Saito, Nara, Japan

[73] Assignee: Nichias Corporation, Tokyo, Japan

[21] Appl. No.: 928,355

[22] Filed: Sep. 12, 1997

Related U.S. Application Data

[62] Division of Ser. No. 574,290, Dec. 18, 1995, abandoned.

[30] Foreign Application Priority Data

Mar. 23, 1995 [JP] Japan .................................. 7-088595

[51] Int. Cl.$^6$ .................................................. F16H 57/02
[52] U.S. Cl. ................................... 74/606 R; 428/319.1; 428/131
[58] Field of Search ..................... 74/606 R; 428/304.4, 428/317.9, 319.1, 131, 241

[56] References Cited

U.S. PATENT DOCUMENTS

| | | | |
|---|---|---|---|
| 4,037,009 | 7/1977 | Severinsen | 428/241 |
| 4,255,482 | 3/1981 | Udagawa | 428/215 |
| 4,399,174 | 8/1983 | Tanaka et al. | 428/67 |
| 4,485,138 | 11/1984 | Yamamoto | 428/131 |
| 4,642,951 | 2/1987 | Mortimer | 428/131 |
| 4,906,501 | 3/1990 | Honma et al. | 428/68 |

FOREIGN PATENT DOCUMENTS 6-184522   7/1994   Japan .

*Primary Examiner*—Vinh T. Luong
*Attorney, Agent, or Firm*—Flynn, Thiel, Boutell & Tanis, P.C.

[57] ABSTRACT

A separate plate for a control valve used in an automatic transmission having an excellent sealing property is provided, independently of smoothness and rigidity of sealing surfaces. The separate plate comprises a metal plate and one or two sealing portions, each of which consists of a foam rubber layer 80 $\mu$m to 500 $\mu$m thick, formed on one or two surfaces thereof. Each of the one or two seal portions consists of a foam rubber layer reinforced with inorganic fiber, organic fiber or an unwoven cloth. Or it may has a two-layered structure consisting of a not yet foamed rubber layer 90 $\mu$m to 300 $\mu$m thick, whose rubber hardness defined by JIS SHORE A is 40 to 95, and a foam rubber layer 80 $\mu$m to 200 $\mu$m thick or a foam rubber layer 80 $\mu$m to 200 $\mu$m thick reinforced with inorganic fiber, organic fiber or an unwoven cloth.

6 Claims, 3 Drawing Sheets

SEPARATE PLATE FOR A CONTROL VALVE USED IN AN AUTOMATIC TRANSMISSION AND METHOD FOR FABRICATING SAME

This is a division of Ser. No. 08/574 290, filed Dec. 18, 1995 now abandoned.

BACKGROUND OF THE INVENTION

The present invention relates to a separate plate having a sealing function for a control valve used in an automatic transmission and method for fabricating same.

A valve body of a control valve disposed e.g. in an automatic transmission of an automobile, etc. is divided into a plurality of parts such as upper and lower halves, etc., as indicated in FIG. 3, and composed of a branching container BC, within which oil paths are formed, and a separate plate SP. Heretofore, in order to seal the oil paths in the branching container BC, such a construction is generally adopted that joining surfaces of the branching container BC and sealing surfaces of flange portions thereof, etc. are subjected to lapping processing and a separate plate SP made of metal or resin is inserted therebetween, and that, in order to improve further the sealing property, a gasket (not indicated in the figure) made of paper having a same form as the separate plate SP is inserted between the separate plate and the branching container BC, etc.

The gasket made of paper has advantages that 1) it is not expensive; 2) it is not fluffy after having been formed into a gasket and has a good superficial smoothness; 3) since it has a good flatness and a great amount of compression, it follows easily the roughness and undulation of sealing parts, etc. However, in addition to disadvantages of the gasket itself that i) since it has a great stress relaxation, axial force of bolts decreases and sealing property becomes unstable; ii) tensile strength in the flat surface direction is low and the gasket is easily destroyed; iii) since because of contraction of paper under influences of humidity the form of the gasket is not stable, the sealing property becomes unstable, it becomes difficult to mount it on a predetermined position, etc.; and iv) it has such problems on the working process that in order to assure the sealing property, finishing of the sealing surfaces of the branching container should be surface finishing of high grade such as lapping, etc. and as the result fabrication process becomes complicated, which causes cost-up, etc.

Therefore, in lieu of the gasket made of paper a separate plate having a sealing function in itself has been proposed. For example, in Japanese Utility Model Publication No. 61-123262 there is disclosed a separate plate, in which surface sealing portions are formed by coating the two surfaces of a metal base plate with rubber.

However, since in the separate plate coated with rubber, soft or hard rubber is used as said rubber and the amount of compression of the rubber layers is small, they cannot follow undulation of the sealing surfaces of a flange of low rigidity and thus the sealing property becomes unstable. Further, at forming the oil paths, burrs are produced at punching, which worsens the sealing property.

SUMMARY OF THE INVENTION

The present invention has been made in view of the problems and the object thereof is to provide a separate plate for a control valve used in an automatic transmission having a good sealing property in spite of smoothness and rigidity of sealing surfaces.

The above object can be achieved by a separate plate for a control valve used in an automatic transmission having one or two sealing portions, each of which comprises a foam rubber layer 80 $\mu$m to 500 $\mu$m thick, disposed on or over one or two surfaces of a metal plate for the separate plate according to the present invention.

Further it is preferable that, in the separate plate for a control valve in an automatic transmission (hereinbelow called simply separate plate), (1) the foam rubber forming the one or two sealing portions is at least a synthetic foam rubber selected from the group consisting of hydrogenated acrylonitrile butadiene rubber, acrylonitrile butadiene rubber, acrylic rubber, and fluoric rubber;

(2) the one or two sealing portions is made of foam rubber layer reinforced with inorganic fiber, organic fiber or an unwoven cloth (hereinbelow called fiber reinforced foam rubber layer); and (3) each of the one or two sealing portions has a two-layered structure, in which a not yet foamed rubber layer 90 $\mu$m to 300 $\mu$m thick, whose rubber hardness defined by JIS SHORE A is 40 to 95, and a foam rubber layer 80 $\mu$m to 200 $\mu$m thick or a fiber reinforced foam rubber layer 80 $\mu$m to 200 $\mu$m thick are superposed on the metal plate one after another.

Following functions and effects can be obtained by constructing the separate plate according to the present invention as described above. That is, 1) since the one or two sealing portions are made of foam rubber, the amount of compression is great, they follow easily undulation or roughness of the inner surface of the branching container, and even if burrs are produced, they can be absorbed in the interior of the seal portions, the sealing property being stabilized in this way;

2) owing to the fact that the one or two sealing portions are made of fiber reinforced foam rubber layer, no transversal bulging-out flow of the foam rubber is produced after clamping of bolts and stress relaxation generated by the flow is reduced; and 3) owing to the fact that each of the one or two sealing portions is constructed by two layers of a not yet foamed rubber layer and a foam rubber layer or a fiber reinforced foam rubber layer, the sealing property thereof is improved, because the foam rubber layer or the fiber reinforced foam rubber layer gives rise to fitness with the inner surface of the branching container and the amount of compression can be adjusted by regulating the thickness of the foam rubber layer or the fiber reinforced foam rubber layer and the not yet foamed rubber layer. At this time, if the thickness of the foam rubber layer (or the fiber reinforced foam rubber layer) is kept small, the transversal bulging-out flow of the foam rubber is kept small and stress relaxation due to the flow is decreased.

DESCRIPTION OF THE PREFERRED EMBODIMENTS

Figure 1:
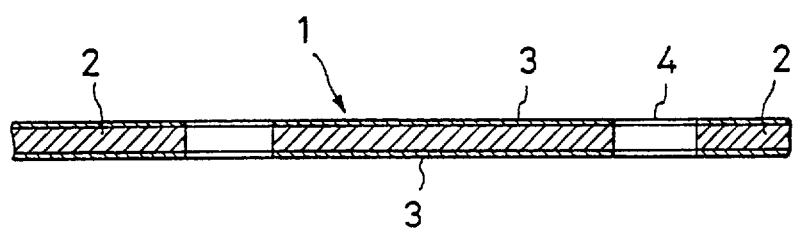
FIG. 1 is a cross-sectional view of the principal part indicating an embodiment of the separate plate for a control valve used in an automatic transmission according to the present invention.

Hereinbelow the present invention will be explained in detail, referring to the drawings.

Figure 3:
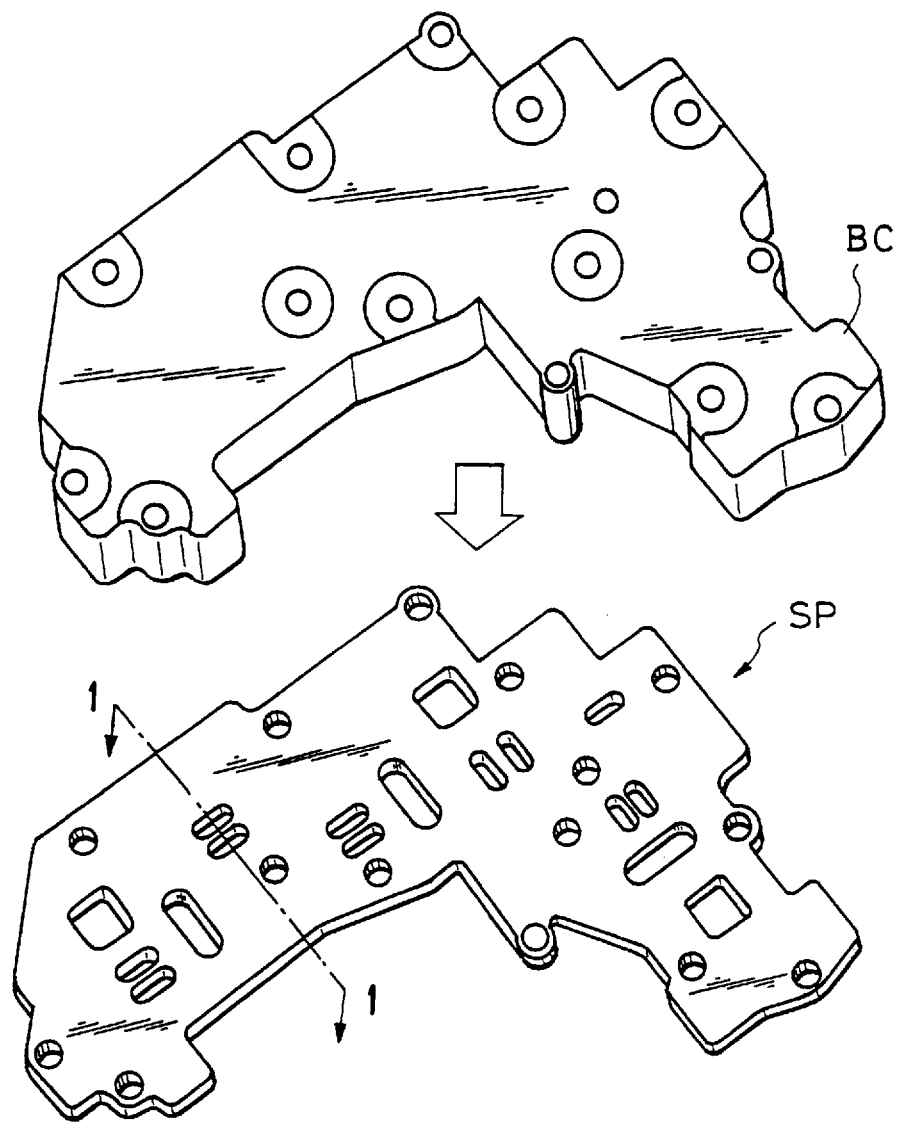
FIG. 3 is a perspective view indicating how to mount a separate plate and a branching container for a control valve used in an automatic transmission.

FIG. 1 is a cross-sectional view of the principal part indicating an embodiment of the separate plate according to the present invention, which is a cross-sectional view corresponding e.g. to the cross-section along the line indicated by 1—1 in FIG. 3. As indicated in the figure, the separate plate 1 is constructed by forming one or two sealing portions 3 on one or two surfaces of a metal plate 2 (two surfaces in the embodiment indicated in the figure) and by forming through holes 4 corresponding to oil paths in the branching container by punching, etc.

Each of the sealing portions. 3 consists of a foam rubber layer 80 $\mu$m to 500 $\mu$m thick. This foam rubber layer is formed by applying rubber raw material in a predetermined thickness on the metal plate 2, which was subjected to a pretreatment such as mechanical treatment, anodizing, primer treatment, etc. e.g. by a usual method, and by foaming the rubber raw material by heat treatment. Further it is possible also to vulcanize at the same time as foam it at need.

In this case, if the thickness of the foam rubber layer is smaller than 80 $\mu$m, the amount of compression is insufficient and it is not possible to obtain the effects of following undulation and roughness of the inner surface of the branching container and absorbing burrs. Further foaming of rubber is performed generally by thermal decomposition and this method gives rise to a physical problem that it is difficult to form a layer thinner than 80 $\mu$m. On the other hand, if the thickness of the foam rubber layer is greater than 500 $\mu$m, the transversal bulging-out flow of the foam rubber after clamping of bolts to the branching container increases and stress relaxation decreases to a degree of that obtained by a paper gasket, which is not preferable.

For the foam rubber layer, in addition to the thickness, the density is also an important factor. This density is defined by the foam magnification factor. The greater the foam magnification factor is, the greater the amount of compression of the foam rubber is, which is more advantageous for the sealing property. According to the present invention it is preferable that the density of the foam rubber layer is comprised between 0.08 and 0.1.

The thickness and the density of the foam rubber layer can be controlled by the application amount of rubber, the foaming time, the foaming temperature, etc.

Either of natural rubber and synthetic rubber can be used for forming the foam rubber layer. For example, chloroprene rubber, hydrogenated acrylonitrile butadiene rubber (HNBR), acrylonitrile butadiene rubber (NBR), acrylic rubber, fluoric rubber, etc. can be cited therefor. Particularly HNBR, NBR, acrylic rubber and fluoric rubber are preferable and they can be used singly or in combination.

Further stress relaxation can be reduced by reinforcing the foam rubber layer with inorganic fiber, organic fiber, or an unwoven cloth. The kind of fiber constituting the inorganic fiber, the organic fiber and the unwoven cloth is not specifically restricted and e.g. aramid fiber, polyester fiber, nylon fiber, etc. can be used therefor. Further, since the valve body can be exposed to high temperature, it is preferable that the fiber and the unwoven cloth are heat resisting.

Figure 4:
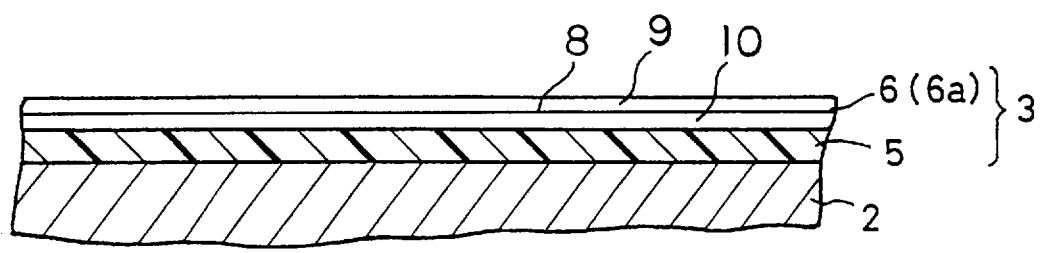
FIG. 4 is a view similar to FIG. 2 but showing the non-woven cloth in the sealing portion.

This fiber reinforced foam rubber layer is preferably constructed by effecting foaming processing by blending whisker of inorganic fiber or organic fiber with the rubber raw material so that the whisker is dispersed uniformly in matrix of the foam rubber. It can have also a sandwich construction, in which inorganic or organic fiber woven in a cloth or an unwoven cloth 8 is put between two foam rubber layers 9, 10. The cloth 8 is shown in FIG. 4. The thickness of the cloth obtained by weaving fiber or the unwoven cloth is preferably about 10 $\mu$m.

Figure 2:
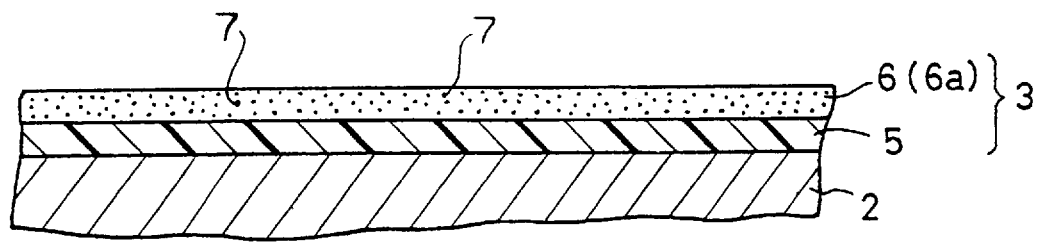
FIG. 2 is a cross-sectional view of the principal part indicating another embodiment of the separate plate for a control valve used in an automatic transmission according to the present invention.

Each of the one or two sealing portions 3 can be a single layer of a foam rubber layer or a fiber reinforced foam rubber layer. Apart therefrom, as indicated in FIG. 2, it may have a two-layered structure, in which a not yet foamed rubber layer 5 90 $\mu$m to 300 $\mu$m thick, whose rubber hardness defined by e.g. JIS SHORE A is to 40 to 95, and a foam rubber layer 6 80 $\mu$m to 200 $\mu$m thick or a fiber reinforced foam rubber layer 6a 80 $\mu$m to 200 $\mu$m thick are superposed on the metal plate 2. The fibers 7 are shown in FIG. 2.

In this case, if the hardness of the not yet foamed rubber layer 5 is smaller than 40, it is too soft and stress relaxation is great. On the contrary, if it is greater than 95, no satisfactory amount of compression can be obtained. Further, in case where the thickness is smaller than 90 $\mu$m, in addition to the fact that no suitable amount of compression can be obtained, when it is combined with a foam rubber layer, so-called buckling takes place. On the contrary, even if it is greater than 300 $\mu$m, no increase in the effect owing thereto is observed, but it causes only cost-up.

On the other hand, concerning the thickness of the foam rubber layer 6 or the fiber reinforced foam rubber layer 6a, if it is smaller than 80 $\mu$m, no satisfactory amount of compression can be obtained and if it is greater than 200 $\mu$m, flow of the foam rubber takes place, which is not preferable.

Hereinbelow the present invention will be made clearer, using some embodiments.

(EMBODIMENT 1 AND EXAMPLES FOR COMPARISON 1 AND 2)

A specimen (EMBODIMENT 1), in which a foam HNBR layer 300 $\mu$m thick was formed on a cold pressed steel plate 1.2 mm thick, and another specimen (EXAMPLE FOR COMPARISON 1), in which a not yet foamed HNBR layer 120 $\mu$m was formed thereon according to Japanese Utility Model Publication No. 61-123262, were prepared to be submitted to a seal test. A similar seal test was effected also by using a paper gasket 200 $\mu$m thick (EXAMPLE FOR COMPARISON 2). In the seal test the specimen was mounted with a clamping pressure per unit area of 50 kgf/cm$^2$ and a sealing width of 3 mm on a flange 15 mm thick having an average roughness (Rz) of 10 $\mu$m at ten points on the surface according to JIS B 0601 and a maximum height (Rmax) of 15 $\mu$m and leakage was observed while supplying air as test liquid. Results of the test are also indicated in TABLE 1 in sealing pressure.

TABLE 1

|  | EMBODIMENT 1 | EXAMPLE FOR COMPARISON 1 1) | EXAMPLE FOR COMPARISON 2 2) |
|---|---|---|---|
| SEALING CONDITION |  |  |  |
| TEST LIQUID |  | AIR |  |
| SEALING WIDTH |  | 3 mm |  |

TABLE 1-continued

|  | EMBODI-MENT 1 | EXAMPLE FOR COMPARISON 1) | EXAMPLE FOR COMPARISON 2) |
|---|---|---|---|
| THICKNESS OF FLANGE | | 15 mm | |
| ROUGHNESS OR UNDULATION OF FLANGE | | Rz = 10 μm, Rmax = 15 μm | |
| CLAMPING PRESSURE PER UNIT AREA | | 50 kgf/cm² | |
| SPECIFICATION OF SEPARATE PLATE | | | |
| THICKNESS OF PLATE (mm) | 1.2 | 1.2 | 1.2 |
| OVERALL THICKNESS OF SEALING PORTIONS (μm) | 300 | — | 120 |
| THICKNESS OF NOT YET FOAMED RUBBER LAYER (μm) | — | — | 120 |
| THICKNESS OF FOAM RUBBER LAYER (μm) | 300 | — | — |
| THICKNESS OF GASKET (μm) | — | 200 | — |
| SEALING PRESSURE (kgf/cm²) | OVER 5 | UNDER 1 | UNDER 1 |

1) Paper Gasket
2) Japanese Utility Model Publication No. 61-123262

From TABLE 1 it can be recognized that a better sealing property is obtained by using the separate plate (EMBODIMENT 1) according to the present invention with respect to the prior art separate plate as well as the paper gasket.

(EMBODIMENTS 2 TO 5)

Several specimens were prepared by varying the thickness of the foam rubber layer and the kind of the used rubber, as indicated in TABLE 2 and the sealing property was measured by the same method as that used for EMBODIMENT 1. Further stress relaxation was measured according to ASTM F-38 Method B and the ratio of compression was also measured. The ratio of compression indicates values obtained by calculation for the sealing portion at a pressure per unit area of 100 kgf/cm².

Results of measurements are indicated also in TABLE 2.

TABLE 2

|  | EMBODI-MENT 2 | EMBODI-MENT 3 | EMBODI-MENT 4 | EMBODI-MENT 5 |
|---|---|---|---|---|
| THICKNESS OF FOAM RUBBER LAYER (μm) | 300 | 300 | 500 | 500 |
| KIND OF FOAM RUBBER LAYER | HNBR | NBR | ACRYLIC | FLUORIC |
| THICKNESS OF METAL PLATE (mm) | 1.2 | 1.2 | 1.4 | 1.4 |
| OVERALL THICKNESS (mm) | 1.8 | 1.8 | 2.4 | 2.4 |
| STRESS RELAXATION | 8 | 8 | 10 | 10 |
| SEALING PRESSURE (kgf/cm²) | OVER 5 | OVER 5 | OVER 10 | OVER 10 |
| RATIO OF COMPRESSION (%) | 50 | 70 | 70 | 70 |

From TABLE 2 it can be confirmed that the separate plate according to the present invention is excellent in sealing property, stress relaxation and ratio of compression, when the thickness of the foam rubber layer is in a region defined by the present invention.

(EMBODIMENTS 6 TO 9)

Specimens were prepared, in which the sealing portion was a fiber reinforced foam rubber layer; where fiber was mixed in the foam rubber layer or an unwoven cloth was used, as indicated in TABLE 3, and sealing property, stress relaxation and ratio of compression were measured by a method similar to that described above.

Results of measurements are indicated also in TABLE 3.

TABLE 3

|  | EMBODI-MENT 6 | EMBODI-MENT 7 | EMBODI-MENT 8 | EMBODI-MENT 9 |
|---|---|---|---|---|
| THICKNESS OF FOAM RUBBER LAYER (μm) | 300 | 300 | 300 | 500 |
| KIND OF FOAM RUBBER LAYER | HNBR | HNBR | HNBR | HNBR |
| THICKNESS OF METAL LAYER (mm) | 1.2 | 1.2 | 1.4 | 1.4 |
| KIND OR FIBER | ARAMID | POLYESTER | — | — |
| KIND OF UNWOVEN CLOTH | — | — | POLYESTER | NYLON |
| THICKNESS OF UNWOVEN CLOTH (μm) | — | — | 10 | 10 |
| OVERALL THICKNESS (mm) | 1.8 | 1.8 | 2.0 | 2.4 |
| STRESS RELAXATION | 6 | 6 | 4 | 4 |
| SEALING PRESSURE (kgf/cm²) | OVER 5 | OVER 5 | OVER 6 | OVER 5 |
| RATIO OF COMPRESSION (%) | 50 | 50 | 50 | 50 |

From TABLE 3 it can be confirmed that the separate plate according to the present invention is excellent in sealing property, stress relaxation and ratio of compression, when the thickness of the fiber reinforced foam rubber layer is in a region defined by the present invention.

(EMBODIMENTS 10 TO 13)

Specimens were prepared, in which the sealing portion was constructed by two layers of a foam rubber layer and a not yet foamed rubber layer, as indicated in TABLE 4 and sealing property, stress relaxation and ratio of compression were measured by a method similar to that described above.

Results of measurements are indicated also in TABLE 4.

TABLE 4

|  | EMBODI-MENT 10 | EMBODI-MENT 11 | EMBODI-MENT 12 | EMBODI-MENT 13 |
|---|---|---|---|---|
| THICKNESS OF FOAM RUBBER LAYER ($\mu$m) | 100 | 80 | 100 | 100 |
| KIND OF FOAM RUBBER LAYER | HNBR | HNBR | NBR | ACRYLIC |
| THICKNESS OF METAL LAYER (mm) | 1.2 | 1.2 | 1.2 | 1.2 |
| THICKNESS OF NOT YET FOAMED RUBBER LAYER ($\mu$m) | 200 | 300 | 200 | 200 |
| KIND OF NOT YET FOAMED RUBBER LAYER | HNBR | HNBR | ACRYLIC | FLUORIC |
| HARDNESS OF NOT YET FOAMED RUBBER LAYER (*) | 80 | — | 80 | 80 |
| OVERALL THICKNESS (mm) | 1.8 | 1.96 | 1.8 | 1.8 |
| STRESS RELAXATION | 5 | 10 | 5 | 5 |
| SEALING PRESSURE (kgf/cm$^2$) | OVER 10 | OVER 5 | OVER 10 | OVER 10 |
| RATIO OF COMPRESSION (%) | 20 | 20 | 23 | 23 |

(*): JIS SHORE A

From TABLE 4 it can be confirmed that the separate plate according to the present invention is excellent in sealing property, stress relaxation and ratio of compression, when it is constructed by two layers of a foam rubber layer and a not yet foamed rubber layer, the thickness of each of which is in a region defined by the present invention.

As explained above, following remarkable effects can be obtained by using the separate plate according to the present invention;

1) since the one or two sealing portions are made of foam rubber, the amount of compression is great, they follow easily undulation or roughness of the inner surface of the branching container, and even if burrs are produced, they can be absorbed in the interior of the seal portions, the sealing property being stabilized in this way;

2) owing to the fact that the one or two sealing portions are made of fiber reinforced foam rubber layer, no transversal bulging-out flow of the foam rubber is produced after clamping of bolts and stress relaxation generated by the flow is reduced; and 3) owing to the fact that each of the one or two sealing portions is constructed by two layers of a not yet foamed rubber layer and a foam rubber layer or a fiber reinforced foam rubber layer, the sealing property thereof is improved, because the foam rubber layer or the fiber reinforced foam rubber layer gives rise to fitness with the inner surface of the branching container and the amount of compression can be adjusted by regulating the thickness of the foam rubber layer or the fiber reinforced foam rubber layer and the not yet foamed rubber layer, at this time, if the thickness of the foam rubber layer (or the fiber reinforced foam rubber layer) is kept small, the transversal bulging-out flow of the foam rubber being kept small, stress relaxation due to the flow being decreased, etc.

What is claimed is:

1. A separate plate for a control valve used in an automatic transmission, comprising:

a metal plate;

a not yet foamed rubber layer formed on at least one surface of said metal plate; and a foam rubber layer formed on said not yet foamed rubber layer which is a surface layer of the separate plate, wherein said not yet foamed rubber layer is 90 $\mu$m to 300 $\mu$m thick and said foam rubber layer is 80 $\mu$m to 200 $\mu$m thick, and wherein said foam rubber layer is reinforced with one of inorganic fiber, organic fiber, and an unwoven cloth.

2. A separate plate according to claim 1, wherein density of said foam rubber layer is in a region comprised between 0.08 and 0.1.

3. A separate plate according to claim 1, wherein said reinforced foam rubber layer is constructed by putting one of said inorganic and organic fiber in the unwoven cloth between two foam rubber layers.

4. A separate plate according to claim 1, wherein said reinforced foam rubber layer is formed by dispersing uniformly whisker of said inorganic or organic fiber in a foam rubber layer.

5. A separate plate for a control valve used in an automatic transmission, comprising:

a metal plate;

a not yet foamed rubber layer formed on at least one surface of said metal plate, said not yet foamed rubber layer being 90 $\mu$m to 300 $\mu$m thick; and a foam rubber layer formed on said not yet foamed rubber layer which is a surface layer of the separate plate, said foam rubber layer being 80 $\mu$m to 200 $\mu$m thick, and said foam rubber being reinforced with a cloth, the cloth having one of inorganic and organic fibers woven therein.

6. In a control valve for an automatic transmission, a branching container having oil paths and a separate plate for sealing the oil paths, said separate plate comprising:

a metal plate;

a non-foamed rubber layer on at least one surface of said metal plate, the non-foamed rubber layer being 90 $\mu$m to 300 $\mu$m thick; and a foam rubber layer on said non-foamed rubber layer remote from the metal plate, said foam rubber layer being a surface layer of said separate plate, said foam rubber layer being 80 $\mu$m to 200 $\mu$m thick and being reinforced by at least one of inorganic fibers, organic fibers, and unwoven cloth.

* * * * *